United States Patent [19]

Ohyama

[11] 4,386,440
[45] Jun. 7, 1983

[54] PIPE CUTTER FOR USE ON A PIPE THREAD CUTTING MACHINE

[75] Inventor: Taketomo Ohyama, Mie, Japan

[73] Assignee: MCC Corporation, Mie, Japan

[21] Appl. No.: 193,105

[22] Filed: Oct. 2, 1980

[30] Foreign Application Priority Data

Oct. 20, 1979 [JP] Japan ............................ 54-135705
Oct. 20, 1979 [JP] Japan ............................ 54-145575[U]
Oct. 20, 1979 [JP] Japan ............................ 54-145576[U]

[51] Int. Cl.³ ............................................ B23G 1/22
[52] U.S. Cl. .................................... 10/87; 81/182;
82/4 C
[58] Field of Search ............... 81/181, 182, 422, 423,
81/424; 30/102; 82/4 C; 10/87

[56] References Cited

U.S. PATENT DOCUMENTS

| | | | |
|---|---|---|---|
| 575,685 | 1/1897 | Brockett | 30/102 |
| 630,925 | 8/1899 | Poppert | 81/182 |
| 702,919 | 6/1902 | Boyd | 30/102 X |
| 721,660 | 3/1903 | Bonney | 81/182 |
| 1,099,872 | 6/1914 | Ballem | 81/182 |
| 1,178,347 | 4/1916 | Ratigen | 81/182 |
| 2,768,550 | 10/1956 | Ingwer | 10/87 |

*Primary Examiner*—Jimmy C. Peters
*Attorney, Agent, or Firm*—Wenderoth, Lind & Ponack

[57] ABSTRACT

A thread cutting machine for pipes comprises a machine base on which pipe holding chucks, a pipe rotation drive mechanism, a thread cutting mechanism and a threaded coupling holding chuck mechanism adapted to hold a threaded coupling such as socket, elbow or the like in position are provided. The machine is capable of fastening the threaded coupling to the pipe after pipe threads have been formed as well as the inherent pipe cutting-off and thread cutting functions.

9 Claims, 8 Drawing Figures

PIPE CUTTER FOR USE ON A PIPE THREAD CUTTING MACHINE

BACKGROUND OF THE INVENTION

This invention relates to a pipe thread cutting machine which is capable of performing the operation of fastening of a threaded pipe coupling such as a socket, elbow or the like onto or into a threaded pipe as well as the cutting-off and thread cutting operations on the pipe.

It has been widely known that thread cutting machines for pipes are used which are adapted to cut a pipe into a pipe section of a predetermined length and then cut threads in the pipe section, as the case may be, after reaming. For example, such conventional type thread machines are disclosed in U.S. Pat. No. 3,095,772. However, since the conventional pipe thread cutting machines of this type have been designed to exclusively perform the operations of cutting-off and thread cutting on pipes, the fastening of a threaded cupling such as a socket, elbow or the like into or onto the threaded pipe has to be performed in a separate or additional manual step outside of the thread cutting machine. Therefore, a demand exists for a pipe thread cutting machine which can perform in succession the operations of cutting-off and thread cutting on a pipe and the operation of fastening of a threaded coupling onto or into the pipe following the thread cutting on the pipe in a brief time space and with high efficiency.

SUMMARY OF THE INVENTION

Therefore, the purpose of the present invention is to provide a pipe thread cutting machine which can satisfactorily meet the demand.

The above and other objects and attendant advantages of the present invention will be more readily apparent to those skilled in the art from a reading of the following detailed description in conjunction with the accompanying drawings which show preferred embodiments of the present invention for the purpose of illustration only but not for limiting the scope of the same in any way.

PREFERRED EMBODIMENT OF THE INVENTION

Figure 1:
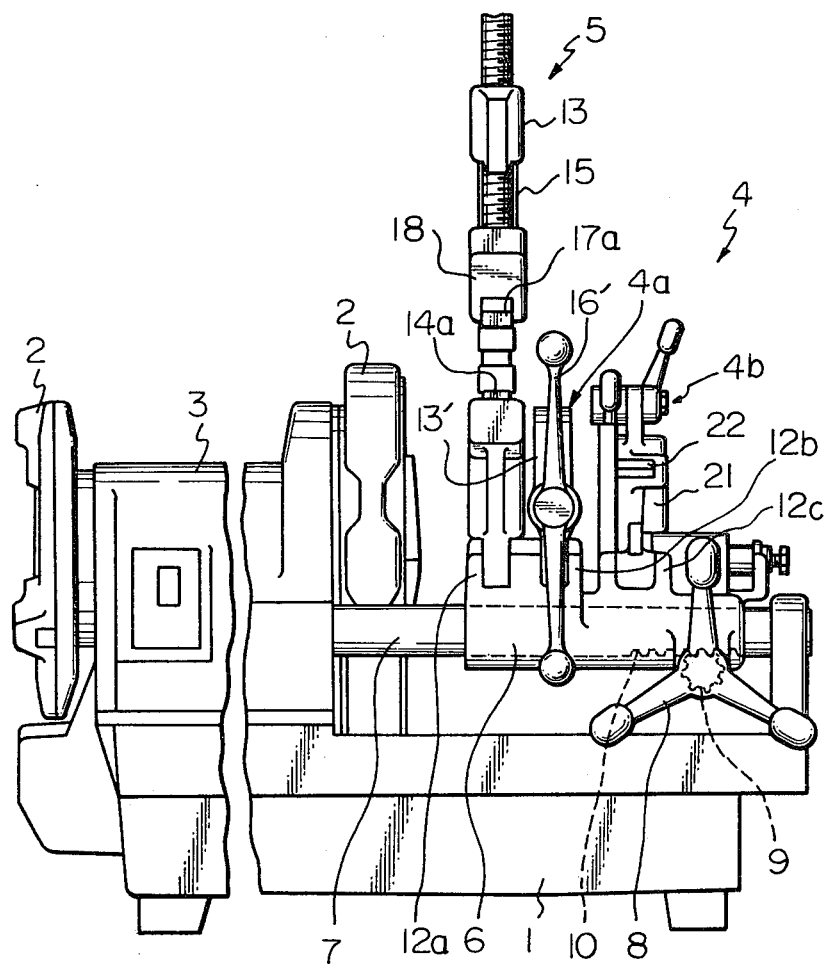
FIG. 1 is a side elevational view of a first embodiment of the present invention, with a portion thereof shown cut away.
Figure 2:
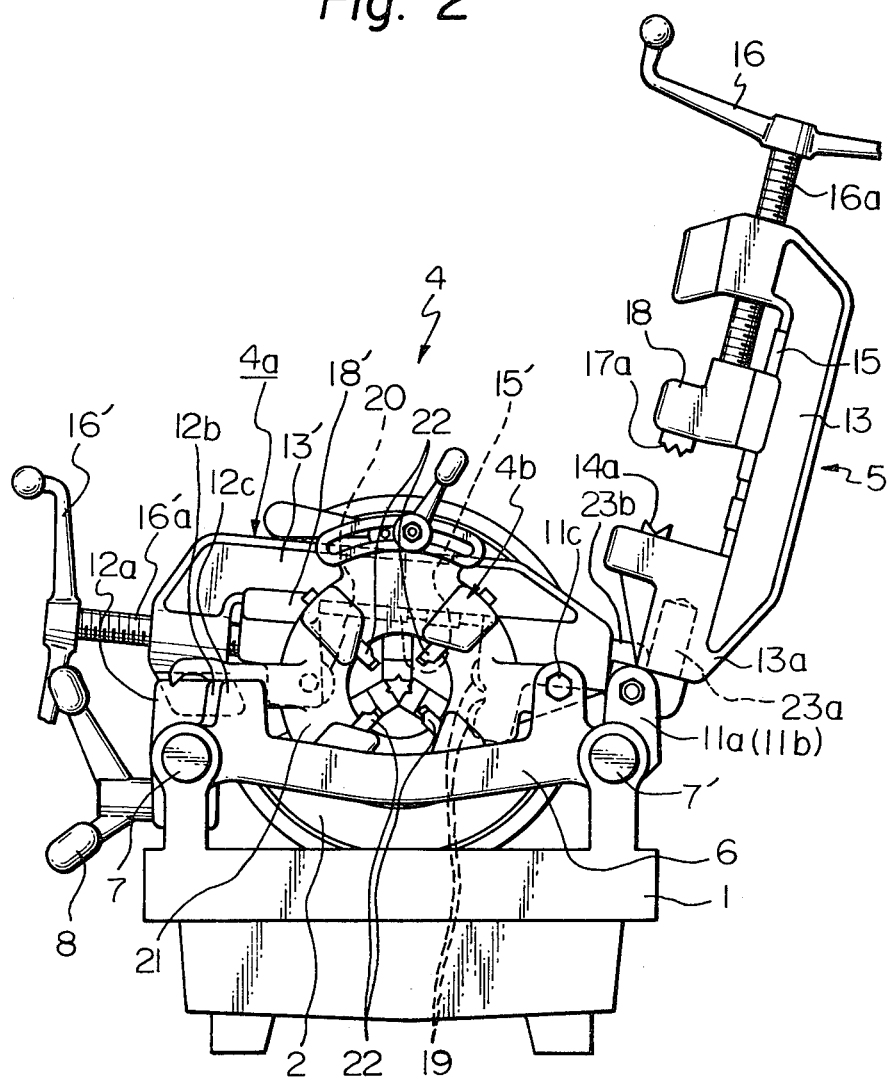
FIG. 2 is a front elevational view of the embodiment of FIG. 1.

The present invention will be now described referring to the accompanying drawings and more particularly, to FIGS. 1 and 2 of the drawings in which a first embodiment of a thread cutting machine for pipes of the invention is shown. In FIGS. 1 and 2, reference numeral 1 denotes the base of the thread cutting machine for pipes, and a drive mechanism 3 with pipe holding chucks 2, 2 is mounted on a rearward portion of the machine base 1, whereas a cutter mechanism 4 for cutting threads on a pipe and a chuck mechanism 5 for holding a threaded coupling such as a socket or the like, for example, which is adapted to be screwed into or onto the threads formed on the pipe are mounted on a forward portion of the machine base 1. Reference numeral 6 denotes a reciprocal slide which is guided along a pair of longitudinally extending parallel guide rods 7, 7' for slidable movement toward and away from the drive mechanism 3, and a feed handle 8 is mounted on the reciprocal slide 6. Secured to one or the inner end of the shaft of the feed handle 8 is a pinion 9 which meshes with a rack 10 formed on one of the guide rods 7. Three hinges 11a, 11b, 11c are provided on the reciprocal slide 6 in a selected longitudinally spaced relationship along one side edge of the slide 6 and a corresponding number of receiving members 12a, 12b, 12c are also provided along the other side edge of the reciprocal slide 6 in the above-mentioned selected longitudinally spaced relationship to make pairs in cooperation with the corresponding opposed hinges 11a, 11b, 11c, respectively. The rearmost hinge 11a swivelably supports one end portion 13a of a substantially C-shaped frame member 13 of the chuck mechanism 5. Namely, the portion 13a of the frame member 13 is secured to a connector 23a which is in turn pivoted to the rearmost hinge 11a. The connector 23a allows the position of the frame member 13 to be adjusted in the direction of the frame axis. The frame member 13 has at the inside of the portion 13a a pawl 14a exchangeably attached thereto. The frame member 13 also includes an inside guide rail 15 extending in the longitudinal direction thereof and a pawl holder or movable member 18 is slidably mounted on the guide rail. The movable member 18 has at the inside thereof a pawl 17a exchangeably attached thereto and is attached to one end of a threaded shaft 16a of a handle 16 so that as the handle 16 is turned in one or the other direction, the pawl 17a moves toward or away from the pawl 14a. Thus, the entire chuck mechanism 5 is swingable between a substantially upright position (FIG. 2) and a substantially horizontal position and is also adjustable so that the position of the pawl 14a is adjusted to compensate for variations in the diameter of a pipe to be processed.

As in the attachment of the frame member 13 to hinge 11a, the intermediate hinge 11b supports one end portion of a substantially C-shaped frame member 13' of a pipe cutter 4a, which forms a part of the cutter mechanism 4, through a connector 23b. The frame member 13' is substantially similar to the frame member 13 of the chuck mechanism 5. The frame member 13' has at the inside of the one end portion thereof a pair of rollers 19, 19 rotatably journalled thereat. A movable member 18' is slidably mounted on a frame rail 15' and is attached to the inner end of a threaded shaft 16a' which is suitably journalled at the other portion of the frame member 13'. A conventional rotary cutter blade 20 is supported by the movable member 18' at the inner end thereof. A handle 16' is attached at the outer end of the shaft 16a' so that as the handle 16' is turned in one or the other direction, the rotary cutter blade 20 supported by the movable member 18' moves toward or away from the rollers 19, 19. Thus, as in the case of the chuck mechanism 5, the entire pipe cutter 4a is swingable between a substantially upright position and a substantially horizontal position (FIG. 2) and is also adjustable so that the position of the rollers 19, 19 is adjusted to compensate for variations in the diameter of a pipe to be processed.

The leading hinge 11c swivelably supports one end portion of a conventional die head 4b so that it is movable between a substantially vertical position and a substantially horizontal position (FIG. 2). The construction of the die head 4b is conventional, so it will be unnecessary to explain it.

The above-mentioned receiving members 12a, 12b and 12c respectively support a free end of the frame member 13 of the chuck mechanism 5, a free end of the frame member 13' of the pipe cutter 4a and a free end of the die head when they are in their horizontal positions and thereby ensure alignment of the centers of each of the chuck mechanism 5, pipe cutter 4a and die head 4b with a pipe to processed.

The operation of the first embodiment of thread cutting machine as described hereinabove and illustrated in FIGS. 1 and 2 will now be described referring to FIGS. 1 and 2. First of all, the chuck mechanism 5 and the die head 4b of the cutter mechanism 4 are set in their substantially upright positions and only the pipe cutter 4a of the cutter mechanism 4 is rotated about the hinge 11b to a predetermined substantially horizontal position. Thereafter, the pipe holding chucks 2, 2 are caused to hold a pipe of an indefinite length to be processed in position and the drive mechanism 3 is then driven and at the same time, the handle 16' is turned to advance the rotary cutter blade 20 of the pipe cutter 4a to cut a pipe section of a predetermined length. Thereafter, the pipe cutter 4a is pivoted to a substantially upright position and a reamer (not shown) chamfers one end of the pipe section as the case may be. After the chamferring operation, the die head 4b is moved from the upright position to a predetermined substantially horizontal position about the hinge 11c and then is axially moved to cause cutter blades 22 to perform a predetermined or desired thread cutting operation on the pipe section. The above-mentioned operation steps to be performed by the thread cutting machine of the invention are substantially identical with those to be performed by any conventional thread cutting machine. However, according to the present invention, after threads have been formed at the ends and/or in another predetermined portion of the pipe section, instead of the die head 4b being pulled away from the pipe section and being rotated to the upright position, a threaded coupling such as a socket or elbow adapted to be screwed into or onto the threads on the pipe section is held between the pawls 14a and 17a on the chuck mechanism 5 and the die head is rotated to a predetermined substantially horizontal position about the hinge 11c. Thereafter, when the drive mechanism 3 is driven to cause the threads on the pipe section to threadably engage with the threads on the coupling while the pipe section is being held by the chucks 2, 2 the coupling is connected to the pipe section. Therefore, the coupling can be threaded on the pipe section during a series of operation steps following the thread cutting operation on the pipe section. Thus, the connection of the coupling with the pipe section can be simply and positively performed without requiring any separate manual work as was conventionally necessary in the field, and thus, the efficiency of the series of operation steps can be substantially improved.

Figure 3:
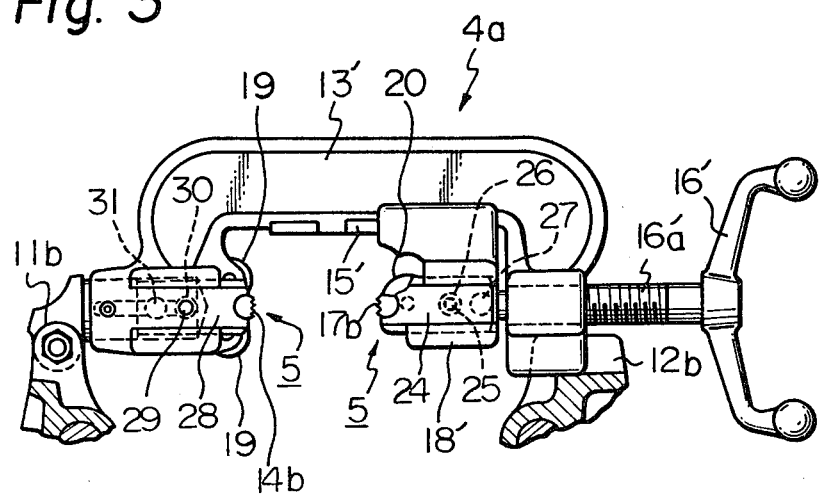
FIG. 3 is a fragmentary rear elevational view of a pipe cutter with a chuck mechanism according to a second embodiment of the present invention, with a portion thereof shown cut away.

Referring now to FIG. 3 of the accompanying drawings in which the second embodiment of a thread cutting machine for pipes of the invention is fragmentarily shown, the second embodiment is basically identical with the first embodiment with respect to the construction and arrangement of the components except that the chuck mechanism 5 is provided on the pipe cutter 4a which forms a portion of the cutter mechanism 4 mounted on the reciprocal slide 6. More particularly, in the second embodiment of the thread cutting mechanism, a frame member used exclusively for the chuck mechanism 5 is not provided and instead the frame member 13' is commonly employed for both the pipe cutter 4a and the chuck mechanism 5. The movable member 18' slidably mounted on the guide rail 15' of the frame member 13' has a support 24 mounted thereon. The support 24 is provided at the leading end thereof with a pawl 17b which is slidable along the movable member 18' in the direction of the guide rail 15'. The support 24 has a pin 25 which is adapted to be manually and selectively inserted into one or the other of two holes 26, 27 in the movable member 18'. By inserting the pin 25 into either the hole 26 or 27, the pawl 17b can be held in a desired projected or retracted position. One or the left-hand end portion of frame member 13' has a support 28 which is provided at one end or the inner end with a pawl 14b and is slidable along the one end portion of the frame member 13' in the direction of the guide rail 15'. The support 28 further has a pin 29 which is adapted to be manually and selectively inserted into either one of two holes 30, 31 in the above-mentioned one end portion of the frame member 13' so that the pawl 14b can be adjusted in its projected or retracted position. These pawls 14b, 17b form the chuck mechanism 5. When the chuck mechanism 5 with the above construction is operated, the pawls 14b, 17b are positioned somewhat forwardly of the rollers 19, 19 and cutter blade 20 and on the other hand, when the pipe cutter 4a is operated, the pawls 14b, 17b are moved to positions rearwardly of the rollers 19, 19 and cutter blade 20.

Figure 4:
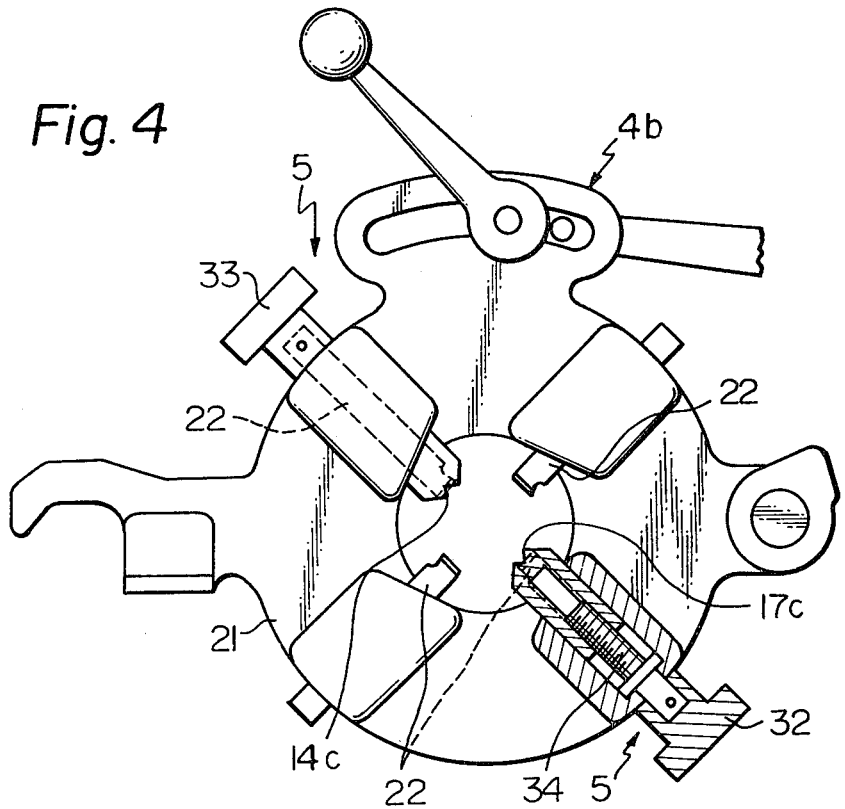
FIG. 4 is a fragmentary front elevational view of a die head with a chuck mechanism according to a third embodiment of the present invention with a portion thereof shown cut away.

FIG. 4 of the accompanying drawings shows the third embodiment of a thread cutting mechanism of the invention and this embodiment is basically identical with the first embodiment with respect to the construction and arrangement of the components except that the chuck mechanism 5 is provided on the die head 4b which forms a part of the cutter mechanism 4 mounted on the reciprocal slide 6. More particularly, in the third embodiment, a frame member used exclusively for the chuck mechanism 5 is not provided and instead a main body 21 of the die head 4b has two pawls 14c, 17c mounted thereon for advancement and retraction movement in addition to four cutter blades 22. When the die head 4b is operated, the four cutter blades 22 are positioned somewhat forwardly of the pawls 14c, 17c and on the other hand, when the chuck mechanism 5 is operated, the cutter blades 22 are positioned somewhat rearwardly of the pawls 14c, 17c.

The advancement and retraction movements of the pawls 14c, 17c are effected by turning the knobs 32, 33 secured to the outer ends of male-threaded rods 34 (only one of the threaded rods is shown in FIG. 4) in threaded engagement with female-threaded interiors of the main bodies of the pawls and keyed to the pawl main bodies.

Incidentally, the position of the chuck mechanism 5 is not limited in any way to that shown in the above embodiments, but rather the chuck mechanism 5 may be mounted on a reamer. It is generally followed that the drive mechanism 3 with the chucks 2, 2 is secured to a rearward portion of the machine base and the cutter mechanism 4 is mounted on the reciprocal slide 6. Even in such a case, if the chuck mechanism used exclusively for the reciprocal slide 6 is not provided, but when the chuck mechanism is provided on the pipe cutter 4a forming a part of the cutter mechanism 4 or on the die head 4b as shown in the embodiments of FIGS. 3 or 4, since it is necessary to replace only the pipe cutter or die head in any conventional pipe thread cutting machine with the counterparts as shown in FIGS. 3 or 4 without requiring any separate frame member for the cutter mechanism, a light weight thread cutting machine can be made with less expense.

Figure 5:
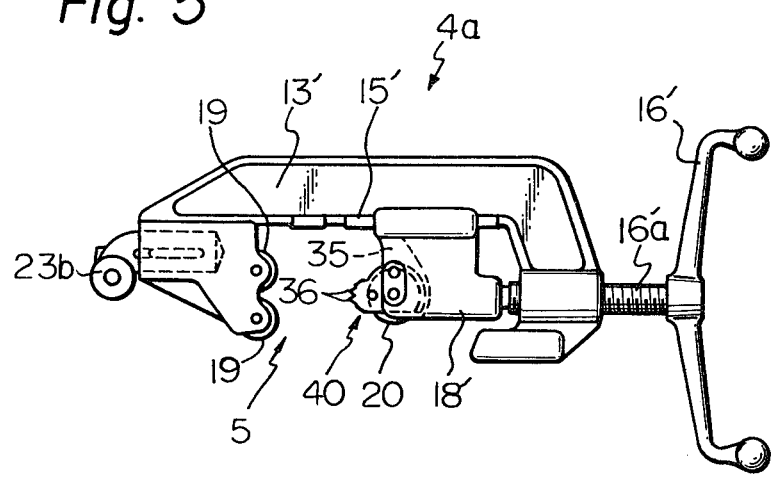
FIG. 5 is a view similar to FIG. 3, but showing a fourth embodiment of the present invention.
Figure 6:
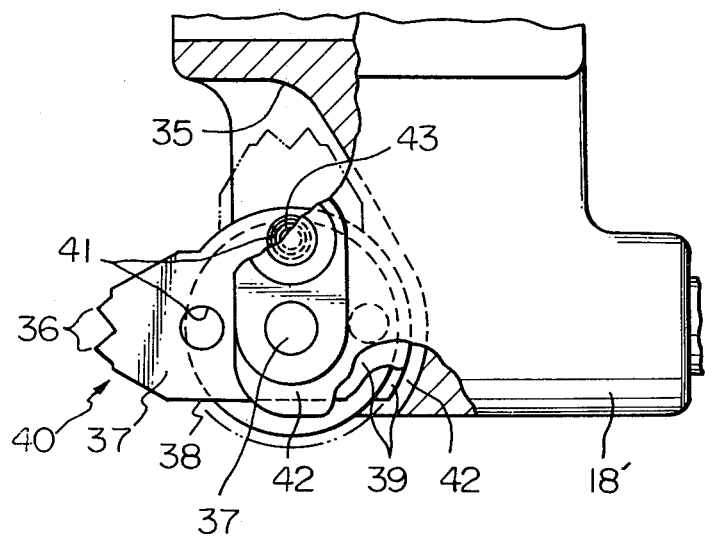
FIG. 6 is a fragmentary front elevational view on an enlarged scale of a portion of FIG. 5.

Now referring to FIGS. 5 and 6 which show the fourth embodiment of a thread cutting machine for pipes of the present invention, in this embodiment, the movable member 18' is formed on the inner or front end with a recess 35 and a chuck pawl 40 is received in and pivoted within the recess 35 by means of a pin 37. The chuck pawl 40 comprises a main body 37 having two angular pawl portions 36 at the leading end and a substantially circular bifurcated mounting portion 39 having a notch 38 at the base end. The chuck pawl 40 is adjustable so as to vary the orientation of the pawl portions 36. The one or left end portion of the frame member 13' opposing the chuck pawl 40 is provided with rollers 19, 19 which cooperate with the chuck pawl 40 to form the chuck mechanism 5. Furthermore, the cutter blade 20 is interposed between the mounting bifurcations 39, 39 of the chuck pawl and is pivoted to the recessed end of the movable member 18'. When the chuck pawl 40 is so positioned that the tips of the pawl portions 36 protrude forwardly of the recessed end of the movable member 18' (the solid line position), the tips of the pawl portions 36 are positioned forwardly of the blade edge of the cutter blade 20. However, when the pawl portions 36 are pivoted to the upright position as shown by the phantom lines in FIG. 6, the blade edge of the cutter blade 20 is positioned forwardly of the tips of the pawl portions 36. When the pawl portions 36 are in the latter position, the rotary cutter blade 20 at the end of the movable member 18' and the rollers 19, 19 at the opposed end of the frame member 13' form a part of the pipe cutter mechanism 5. In FIGS. 5 and 6, reference numeral 23b denotes a connector for securing the frame member 13' to the hinges 11b, reference numeral 41 denotes stop ball receiving holes provided in the chuck pawl 40 to secure the chuck pawl 40 to mounting plates 42, 42 on the movable member 18', and reference numeral 43 denotes a stop ball provided in the mounting plates 42 and selectively urged into one or the other of the holes 41 under the force of a spring (not shown). With the above-mentioned construction and arrangement of the components of the fourth embodiment of the thread cutting machine, when the cutter mechanism is operated, the tips of the pawl portions 36 on the chuck pawl are positioned rearwardly of the blade edge of the rotary cutter blade 20 and the rotary cutter blade 20 and the rollers 19, 19 at the left end portion of the frame member 13' are employed. On the other hand, when the chuck mechanism is operated, the tips of the pawl portions 36 on the chuck pawl 40 are positioned forwardly of the blade edge of the cutter blade 20 and the operation handle 16' is turned so as to cause the chuck mechanism comprising the chuck pawl 40 and rollers 19, 19 to hold a threaded coupling such as a socket or elbow adapted to be screwed onto or into the threads on a pipe.

Figure 7:
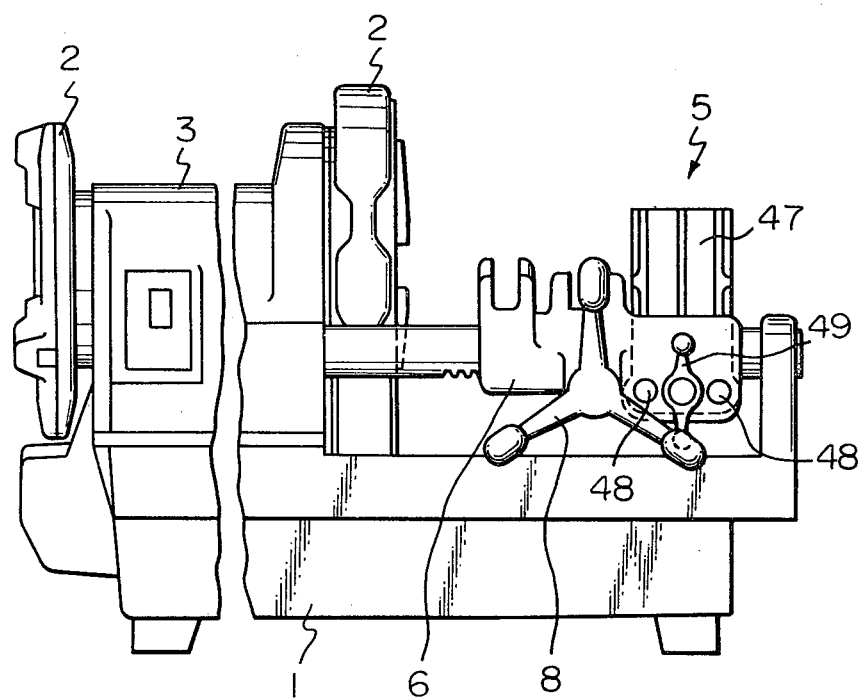
FIG. 7 is a view similar to FIG. 1, but showing a fifth embodiment of the present invention with a portion thereof eliminated for the purpose of charity of illustration.
Figure 8:
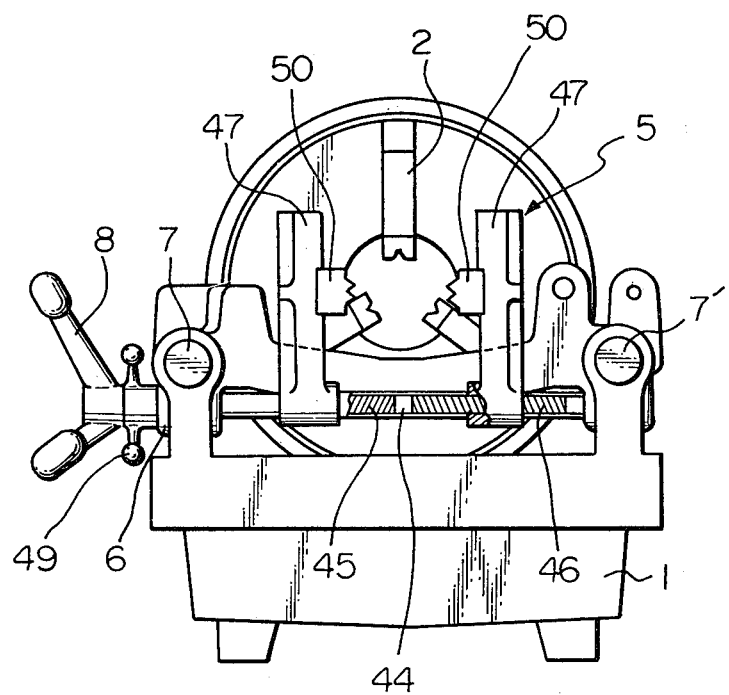
FIG. 8 is a front elevational view of the embodiment of FIG. 7, with a portion thereof shown cut away.

FIGS. 7 and 8 show the fifth embodiment of a thread cutting machine for pipes of the present invention. In this embodiment, instead of the chuck mechanism 5 mounted on the reciprocal slide 6 being hinged to the reciprocal slide 6, the chuck mechanism is opened and closed on the slide 6. To put it more precisely, the chuck mechanism 5 includes a threaded rod 44 rotatably mounted on the reciprocal slide 6, and the rod 44 is provided with opposite-hand threads 45, 46 for threaded engagement with chuck bodies 47, 47. Guide rods 48, 48 extend through the chuck bodies 47, 47 and when the handle 49 secured to one end of the threaded rod 44 is turned in one or the other direction, the chuck bodies 47, 47 are caused to move toward or away from each other to thereby adjust the distance between chuck pawls 50, 50 mounted on the chuck bodies 47, 47.

With the above-mentioned construction and arrangement of the components of the fifth embodiment as described above and illustrated in FIGS. 7 and 8, while the pipe having the threaded end or ends is being held by the chucks 2, 2 in the rearward portion of the machine base 1 and the threaded piping coupling such as a socket and elbow is being held by the threaded coupling holding chuck mechanism 5 in the forward portion of the machine base 1, when the drive mechanism 3 is driven, since the pipe is rotated by the rotating chucks 2, 2, but the threaded coupling is held against rotation by the chuck mechanism 5, the threaded coupling is instantly screwed onto or into the adjacent threaded end of the threaded pipe. After the connection of the coupling with the threaded pipe, it is only necessary to terminate the operation of the drive mechanism 3 and release the threaded coupling from the chuck mechanism and release the threaded pipe from the chucks 2, 2.

As is clear from the foregoing description in connection with several preferred embodiments of the invention, according to the present invention, there have been provided thread cutting machines for pipes wherein the threaded-connection between a pipe and a coupling can be easily and positively performed following the inherent cutting operations such as the pipe cutting-off and thread cutting operations and thus, the present invention contributes greatly to the art.

While several embodiments of the invention have been shown and described in detail, it will be understood that the same are for the purpose of illustration only and not to be taken as a definition of the invention, reference being had for such purpose to the appended claims.

What is claimed is:

1. A pipe cutter apparatus for use on a pipe thread cutting machine, said apparatus comprising:
 a frame member having first and second end portions and a guide rail extending along an inner edge of said frame member between said first and second end portions in a direction along an axis of said frame member;

a threaded shaft extending through said first end portion of said frame member in threaded engagement therewith in a direction parallel to said axis, said shaft having first and second ends, and an operation handle fixed to said first end;

a movable member connected to said second end of said threaded shaft and engaging said guide rail for movement therealong, said movable member having an inner end portion facing said second end portion of said frame member;

a cutter mechanism provided between said inner end portion of said movable member and said second end portion of said frame member, said cutter mechanism including a rotary cutter blade for cutting a pipe;

a chuck mechanism including at least a chuck pawl having a tip and mounted on said movable member for movement relative thereto to adjust the position of said tip with respect to the position of a cutting edge of said rotary cutting blade; and connector means connected to said second end portion of said frame member from mounting said frame member for pivotal movement on a pipe thread cutting machine and for adjusting the position of said frame member with respect to the pipe thread cutting machine in the direction of said axis.

2. An apparatus as claimed in claim 1, wherein said inner end portion of said movable member has therein a recess, and said chuck pawl is pivotally mounted within said recess such that the orientation of said tip may be varied.

3. An apparatus as claimed in claim 2, wherein said chuck pawl includes a bifurcated body portion pivotally mounted within said recess about a shaft, and said rotary cutter blade is mounted on said shaft at a location between the bifurcations of said body portion, said chuck pawl being rotatable about said shaft between a chuck position, whereat said tip extends beyond said rotary cutter blade toward said second end portion of said frame member, and a cutter position, whereat said tip extends in a direction other than toward said second end portion of said frame member and said rotary cutting blade faces said second end portion of said frame member.

4. An apparatus as claimed in claim 3, further comprising a ball detent for retaining said chuck pawl in said respective chuck and cutter positions.

5. An apparatus as claimed in claim 1, wherein said chuck mechanism comprises said chuck pawl mounted on said inner end portion of said movable member and rollers mounted on said second end portion of said frame member.

6. An apparatus as claimed in claim 1, wherein said cutter mechanism comprises said rotary cutter blade mounted on said inner end portion of said movable member and rollers mounted on said second end portion of said frame member.

7. An apparatus as claimed in claim 1, wherein said rotary cutter blade is mounted on said inner end portion of said movable member, and said chuck mechanism comprises a support mounted on said movable member for movement along said axis with respect thereto between a projected position and a retracted position, said chuck pawl being mounted on an inner leading end of said support, such that said tip extends beyond said rotary cutter blade when said support is in said projected position and such that said rotary cutter blade extends beyond said tip when said support is in said retracted position.

8. An apparatus as claimed in claim 7, further comprising pin and hole means provided in said movable member and said support for retaining said support in said projected and retracted positions.

9. An apparatus as claimed in claim 7, wherein said chuck mechanism further comprises a pawl member mounted on said second end portion of said frame member for movement toward and away from said chuck pawl.

* * * * *